(12) United States Patent
Chen

(10) Patent No.: US 10,342,339 B2
(45) Date of Patent: Jul. 9, 2019

(54) MULTIUSE FOLDABLE FURNITURE

(71) Applicant: GUANGZHOU JISILI BABY PRODUCTS CO. LTD., Guangzhou (CN)

(72) Inventor: Wei Chen, Guangzhou (CN)

(73) Assignee: GUANGZHOU JISILI BABY PRODUCTS CO. LTD., Guangzhou (CN)

(*) Notice: Subject to any disclaimer, the term of this patent is extended or adjusted under 35 U.S.C. 154(b) by 0 days.

(21) Appl. No.: 15/743,675

(22) PCT Filed: Apr. 20, 2016

(86) PCT No.: PCT/CN2016/079728
§ 371 (c)(1),
(2) Date: Jan. 11, 2018

(87) PCT Pub. No.: WO2017/181362
PCT Pub. Date: Oct. 26, 2017

(65) Prior Publication Data
US 2018/0206634 A1   Jul. 26, 2018

(51) Int. Cl.
*A47B 85/04* (2006.01)
*A47C 4/04* (2006.01)
(Continued)

(52) U.S. Cl.
CPC .............. *A47B 85/04* (2013.01); *A47B 3/08* (2013.01); *A47C 4/04* (2013.01); *A47C 13/00* (2013.01); *B62B 3/025* (2013.01); *A47B 3/02* (2013.01)

(58) Field of Classification Search
CPC .. A47B 85/04; A47B 3/08; A47B 3/02; A47C 4/04; A47C 13/00
(Continued)

(56) References Cited

U.S. PATENT DOCUMENTS

| | | | | |
|---|---|---|---|---|
| 7,207,623 B2* | 4/2007 | Milinov | ................ | A47B 85/04 297/124 |
| 7,753,441 B1* | 7/2010 | Gray, Jr. | ................ | A01K 97/22 297/188.01 |

(Continued)

FOREIGN PATENT DOCUMENTS

| | | |
|---|---|---|
| CN | 2925247 Y | 7/2007 |
| CN | 200947935 Y | 9/2007 |

(Continued)

*Primary Examiner* — Mark R Wendell
(74) *Attorney, Agent, or Firm* — Gokalp Bayramoglu

(57) ABSTRACT

A multiuse foldable furniture including a main body and two sets of side supports, the main body includes a seat plate and a back plate, the seat plate is hinged with the back plate, the two sets of side supports are respectively disposed at two sides of the main body; each set of side support includes a front support, a back support, and a retracting sleeve, the retracting sleeve is slidably sleeved outside the front support, the retracting sleeve is hinged with the back plate, the top of the front support is hinged with the back plate, the top of the back support is hinged with the seat plate, a supporting connector is set between the front support and the back support, an inner side and an outer side of both ends of the supporting connector are hinged with the front support and the back support, respectively.

12 Claims, 5 Drawing Sheets

(51) Int. Cl.
*A47B 3/08* (2006.01)
*B62B 3/02* (2006.01)
*A47C 13/00* (2006.01)
*A47B 3/02* (2006.01)

(58) Field of Classification Search
USPC .......................................................... 297/51
See application file for complete search history.

(56) References Cited

U.S. PATENT DOCUMENTS

| | | | | |
|---|---|---|---|---|
| 8,025,332 B2* | 9/2011 | Tsonev | ..................... | A47C 7/70 |
| | | | | 297/119 |
| 2006/0055213 A1* | 3/2006 | Milinov | ................. | A47B 85/04 |
| | | | | 297/124 |
| 2006/0145519 A1* | 7/2006 | Hardt, II | ................ | A47B 85/04 |
| | | | | 297/124 |
| 2016/0066687 A1* | 3/2016 | Frankel | ................. | A47B 43/00 |
| | | | | 211/149 |

FOREIGN PATENT DOCUMENTS

| | | |
|---|---|---|
| CN | 201079170 Y | 7/2008 |
| CN | 201264636 Y | 7/2009 |
| CN | 101516235 A | 8/2009 |
| CN | 102871391 A | 1/2013 |
| CN | 204467567 U | 7/2015 |

* cited by examiner

MULTIUSE FOLDABLE FURNITURE

CROSS REFERENCE TO RELATED APPLICATIONS

This application is the national phase entry of International Application No. PCT/CN2016/079728, filed on Apr. 20, 2016, the entire contents of which are incorporated herein by reference.

TECHNICAL FIELD

The disclosure relates to the field of furniture, and in particular, to a multi-use foldable furniture.

BACKGROUND

Foldable furniture is an important category of modern furniture. It is quite popular due to the characteristics like simple shape, multi-functions, easy to use, dual-usage for home or travel, convenient to disassemble and fold, occupies less space, etc. Existing foldable furniture is almost the ones with single purpose, such as a foldable chair. In order to utilize resources better, people started to develop multiuse foldable furniture, such as the furniture which can be folded into a chair or a table. For example, Chinese utility model patent publication number CN200947935Y discloses a multiuse furniture, the two sides of the back frame thereof are respectively hinged with an armrest frame, and a transverse supporting rod is fixedly connected respectively to the middle of the back frame and the middle of the armrest frame, a back plate is arranged between the top beam of the back frame and the supporting rod, a seat plate is arranged below the supporting rod, and the back plate is movably connected with the seat plate and the back frame. The multiuse furniture can be conveniently assembled into a seat or a table, and folded into a flat shape when not in use, thus, is convenient for centralized stacking and transporting.

The existing multiuse foldable furniture still has the problems like being inconvenient to fold, having large size in the folded state, inflexible conversion between various usage states, etc.

SUMMARY

In view of the above problems, it is necessary to provide a multi-use foldable furniture.

In order to achieve the above objective, the following technical solutions are adopted:

Multi-use foldable furniture, comprises:

a main body and two sets of side supports, the main body comprises a seat plate and a back plate, the seat plate is hinged with the back plate, the two sets of side supports are respectively disposed at two sides of the main body;

each set of side supports comprises a front support, a back support, and a retracting sleeve, the retracting sleeve is slidably sleeved outside the front support, the retracting sleeve is hinged with the back support, the top of the front support is hinged with the back plate, the top of the back support is hinged with the seat plate, a supporting connector is set between the front support and the back support, an inner side and an outer side of both ends of the supporting connector are hinged with the front support and the back support, respectively.

Preferably, a first clutching buckle is arranged on the retracting sleeve, configured to limit the sliding of the retracing sleeve.

Preferably, the outer side of one end of the supporting connector is hinged with the front support, the inner side of the other end of the supporting connector is hinged with the back support, and the supporting connector is configured to limit the maximum angle between the front support and the back support when in an open state, so that the positions of the front support and the back support are relatively fixed.

Preferably, the supporting connector is a rigid supporting connector or a flexible supporting connector. For instance, the supporting connector of the invention can be made from not only soft and non-elastic rope materials, but also from metallic materials.

Preferably, the seat plate is hinged at the middle to lower part of the back plate.

Preferably, the multiuse foldable furniture further comprises roller sets, and a roller set is detachably installed at the bottom of each front support and back support.

Preferably, each roller set comprises a rolling wheel and a fixing sleeve, and the rolling wheel is installed at the bottom of the front support or the bottom of the back support through the fixing sleeve, and a second clutch clutching buckle is set on the fixing sleeve, and the second clutch clutching buckle is used for detachably installing the roller set at the bottom of the front support or the bottom of the back support.

Preferably, the multiuse foldable furniture further comprises a push handle installed at the top of the back plate.

Preferably, the push handle is detachably mounted at the top of the back plate.

Preferably, the multiuse foldable furniture further comprises a seat plate cushion, wherein the seat plate cushion is arranged on the front of the seat plate.

Preferably, the multiuse foldable furniture further comprises a back plate cushion, wherein the back plate cushion is arranged on the front of the back plate.

Preferably, two front supports are connected by a front cross rod, and two back supports are connected by a back cross rod.

Compared with the prior art, the invention has the following beneficial effects:

The multiuse foldable furniture of the present invention can be assembled into a chair, a table or a trolley, which is able to realize multiple functions, save resources and reduce waste. The multiuse foldable furniture of the present invention has the advantages like, it can be folded or unfolded directly at any state, converted easily between various states, used conveniently and flexibly, occupies less space in the folded state and is easy to carry.

Figure 1:
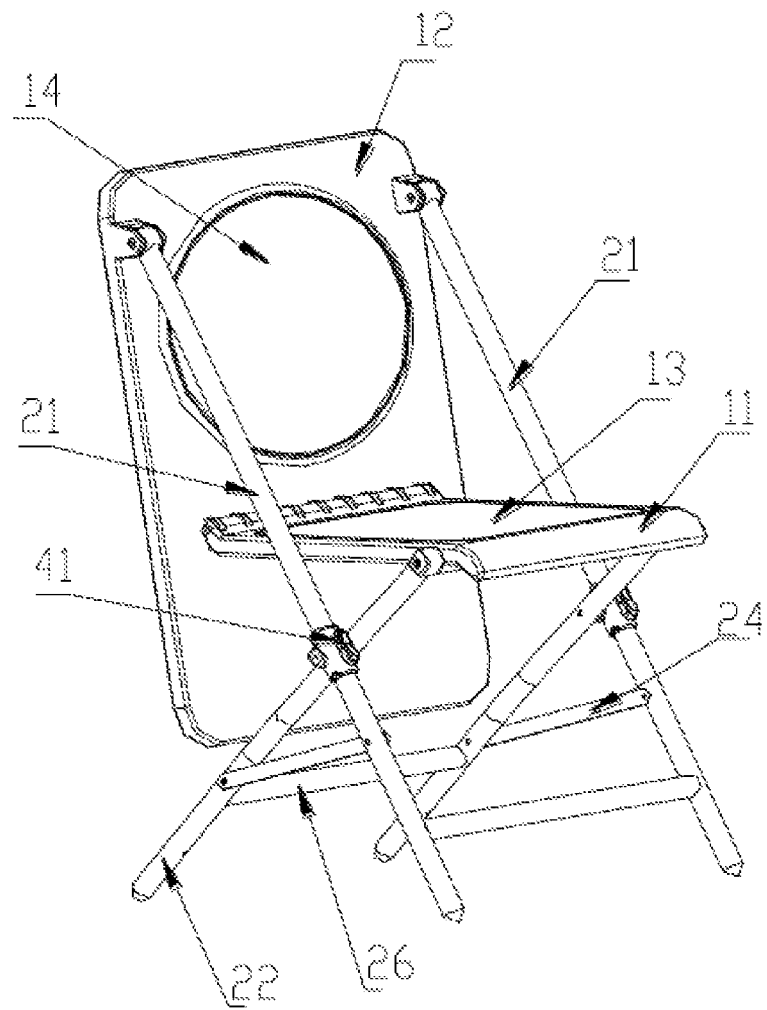
FIG. 1 is a schematic diagram of the chair state of multiuse foldable furniture according to embodiment 1 of the present disclosure.

The appended drawing reference signs are as follows:

main body 1, side support 2, roller set 3, seat plate 11, back plate 12, seat plate cushion 13, back plate cushion 14, front support 21, back support 22, retracting sleeve 23, supporting connector 24, front cross rod 25, back cross rod 26, rolling wheel 31, fixing sleeve 32, first clutching buckle 41, second clutching buckle 42, push handle 5.

DETAILED DESCRIPTION

In order to illustrate the present invention better, the invention is further described below with reference to the accompanying drawings and specific embodiments.

Embodiment 1

Figure 2:
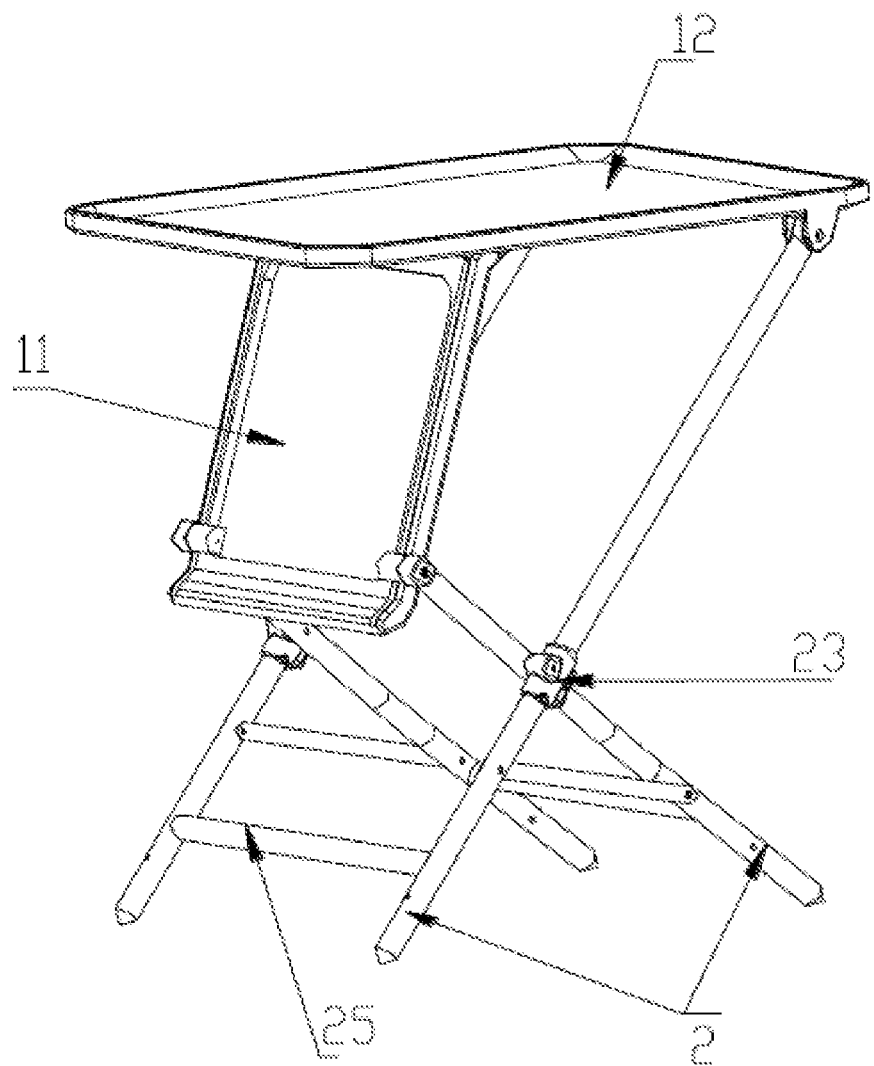
FIG. 2 is a schematic diagram of the table state of multiuse foldable furniture according to embodiment 1 of the present disclosure.

As shown in FIG. 1 and FIG. 2, a multiuse foldable furniture, comprising main body 1 and two sets of side support 2, wherein the main body 1 comprises seat plate 11 and back plate 12, the seat plate 11 is hinged at the middle to lower part of the back plate 12 through a pin, the two sets of side support 2 are respectively disposed on the two sides of the main body 1; each set of side support 2 comprises front support 21, back support 22 and retracing sleeve 23, the top of the front support 21 is hinged in the upper part of the back plate 12, the back plate 12 can rotate by 360 degrees around the hinge joint of the back plate 12 and the front support 21, the top of the back support 22 is hinged with the front part of the seat plate 11, and the front support 21 is longer than the back support 22, the front support 21 is located on the outer side of the back support 22.

In the embodiment, the front support 21 is hinged with the back support 22 through the retracting sleeve 23, the retracting sleeve 23 is slidably sleeved outside the front support 21, the retracting sleeve 23 is hinged with the back support 22, the back support 22 can slide along the front support 21 through the retracting sleeve 23, thus realizing the conversion between various folding or unfolding states.

Supporting connector 24 is disposed between the front support 21 and the back support 22, and two ends of the supporting connector 24 are respectively hinged with the front support 21 and the back support 22, the front support 21 is located on the outer side of the supporting connector 24, and the back support 22 is located on the inner side of the supporting connector 24. The supporting connector is used for limiting the maximum angle between the front support and the back support when in an open state, so that the positions of the front support and the back support are relatively fixed, thereby limiting the sliding range of the retracting sleeve 23 on the front support 21. In the embodiment, the supporting connector is a rigid supporting connector, such as a metal supporting connector.

Further, first clutching buckle 41 is disposed on the retracting sleeve 23, configured to limit the sliding of the retracting sleeve 23. The specific structure of the clutching buckle is well known to those skilled in the art, and is not repeated herein. When the first clutching buckle 41 is in a buckling state, and the retracting sleeve 23 is buckled in a positioning hole in the front support 21, so that the retracting sleeve 23 is fixed on the front support 21 and unable to freely slide along the front support 21; when the first clutching buckle 41 is in an open state, the retracting sleeve 23 is separated from the positioning hole in the front support 21, so that the retracting sleeve 23 can freely slide along the front support 21.

Further, two front supports 21 are connected by front cross rod 25, and two back supports 22 are connected by back cross rod 26. Connecting the side support 2 through the cross rod not only can make the side support 2 more stable, but also can make the two front supports 21 and the two back supports 22 move simultaneously, thus convenient to fold.

Furthermore, the multiuse foldable furniture further comprises seat plate cushion 13 and back plate cushion 14, the seat plate cushion 13 is embedded in the front surface of the seat plate 11, the back plate cushion 14 is embedded in the front face of the back plate 12. The materials and shapes of the seat plate cushion 13 and the back plate cushion 14 used in the invention meet the requirement of ergonomic, thus very comfortable to sit. When the multiuse foldable furniture is in a table state, the seat plate cushion 13 and the back plate cushion 14 are hidden in the lower place and are not easy to get dirty and damaged.

The multiuse foldable furniture can be converted into a table or a chair. The chair state, the table state and the conversion between the two states are specifically described below with reference to FIG. 5.

The chair state: the seat plate 11 is hinged at the middle to lower part of the back plate 12 through a pin, the front face of the seat plate 11 is upward, the front face of the back plate 12 is forward, and the seat plate cushion 13 is installed on the front face of the seat plate 11, the back plate cushion 14 is installed on the back plate 12, and the two sets of side support 2 are located on the two sides of the main body 1 respectively; each set of side support 2 comprises a front support 21 and a back support 22, the top of the front support 21 is hinged in the upper part of the back plate 12, the top part of the back support 22 is hinged with the seat plate 11. The front support 21 and the back support 22 are hinged through the retracting sleeve 23, the retracting sleeve 23 is slidably sleeved outside the front support 21. A supporting connector is disposed between the front support and the back support, and the two ends of the supporting connector are hinged with the front support and the back support respectively, the front support 21 is in the front and the back support 22 is in the back, leading an open state.

Figure 5:
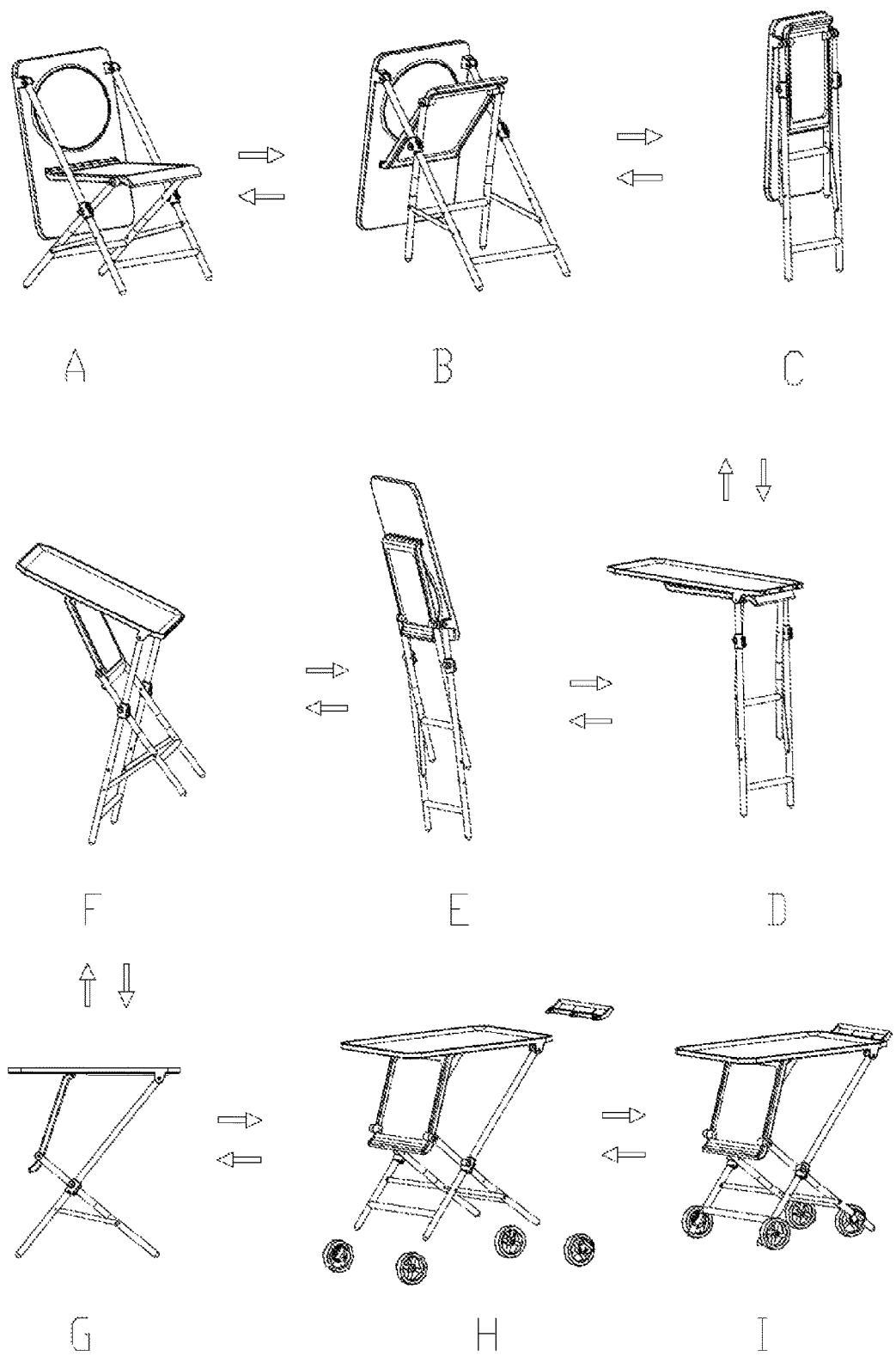
FIG. 5 is a schematic diagram of the conversions between various states of the multiuse foldable furniture according to the disclosure.

Method of conversion from the chair state to the table state is as follows: the front part of the seat plate 11 of the chair state (FIG. 5) is lifted upwards, and the retracting sleeve 23 slides upwards along the front support 21, the seat plate 11 rotates to be overlapped with the back plate 12, the back support 22 rotates forwards to be overlapped with the front support 21 (FIG. 5C); the lower part of the back plate 12 is lifted upwards, so that the back surface of the back plate 12 is upward, the back support 22 continues to rotate forwards to the front side of the front support 21; and the front part of the seat plate 11 is driven to move backwards under the rotation of the back support 22, when the front support 21 and the back support 22 are in an unfolded state, the back plate 12 is supported by the seat plate 11, and the back surface of the back plate 12 is horizontally upward, thereby convert into the table state (FIG. 5G). By following the reverse steps, the table state can be converted into the chair state.

The table state: The back surface of the back plate 12 is upward, and one end of the seat plate 11 is hinged on the front surface of the back plate 12, the seat plate 11 is located below the back plate 12, and the other end of the seat plate 11 is hinged at the top part of the back support 22, and one end of the backboard 12 is hinged at the top part of the front support 21, the front support 21 and the back support 22 are hinged through a retracting sleeve 23, the retracting sleeve 23 is slidably sleeved outside the front support 21, and the retracting sleeve 23 is hinged with the back support 22.

Embodiment 2

Figure 3:
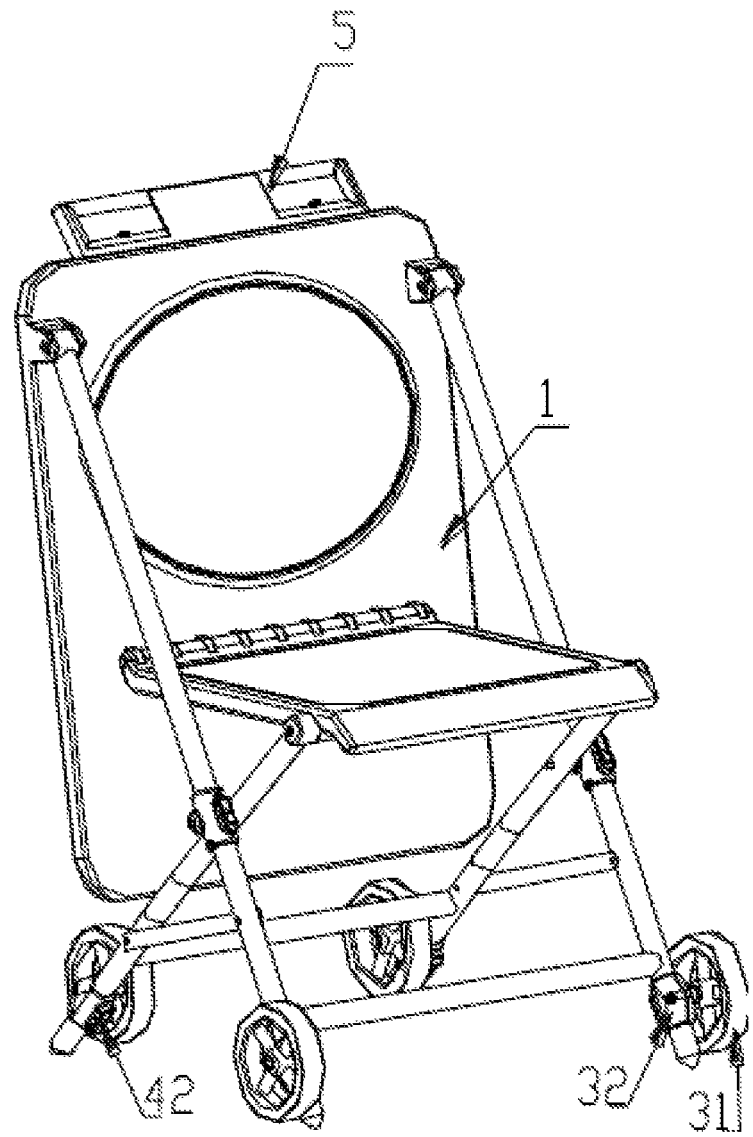
FIG. 3 is a schematic diagram of the chair state of multiuse foldable furniture according to embodiment 2 of the present disclosure.
Figure 4:
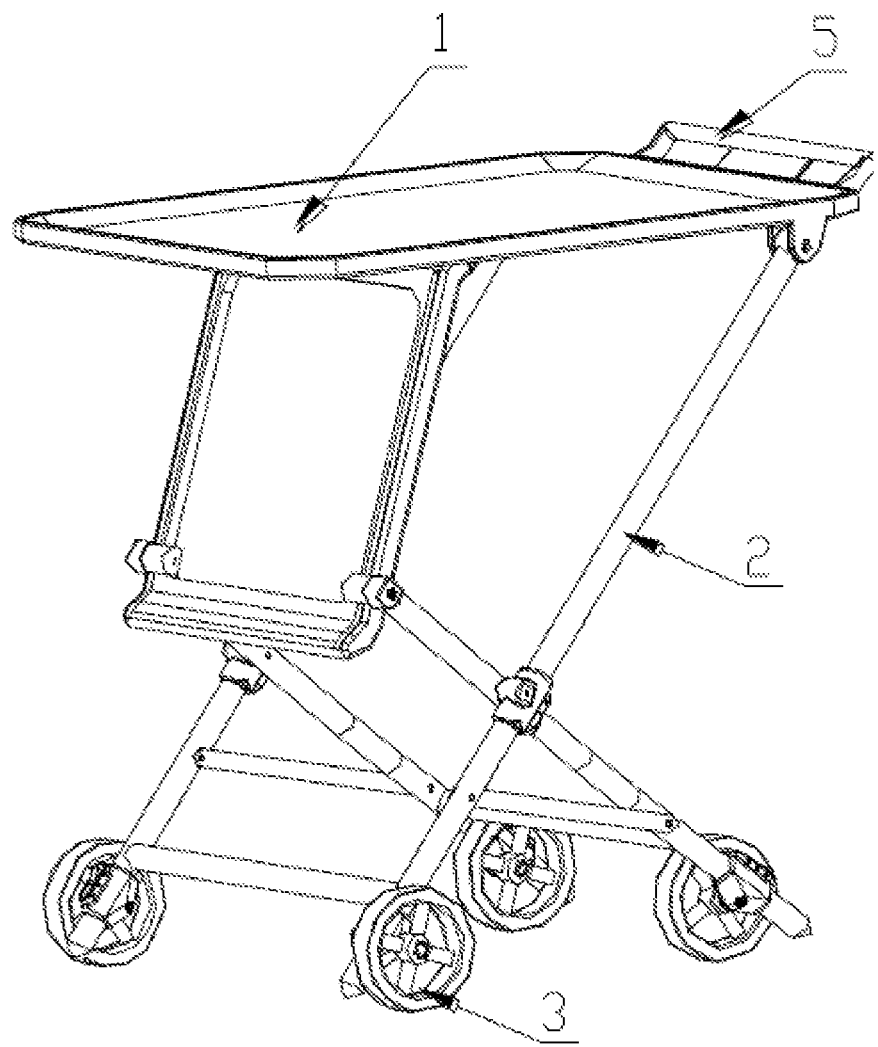
FIG. 4 is a schematic diagram of the trolley state of multiuse foldable furniture according to embodiment 2 of the disclosure.

As shown in FIG. 3 and FIG. 4, except the structure in the embodiment 1, the multiuse foldable furniture in embodiment 2 further comprises a roller set 3 and a push handle 5. A roller set 3 is detachably installed at the bottom of each front support 21 and the back support 22, the push handle 5 is detachably arranged at the top part of the back plate 12. The roller set 3 and the push handle 5 in this embodiment are detachable, thereby convenient to replace and maintain.

The multiuse foldable furniture in this embodiment further comprises a supporting connector 24, the supporting connector 24 is disposed between the front support 21 and the back support 22, and the inner side and the outer side of the two ends of the supporting connector 24 are respectively hinged with the front support 21 and the back support 22, the front support 21 is on the outer side of the supporting connector 24, and the back support 22 is in the inner side of the supporting connector 24. The supporting connector is used for limiting the maximum angle between the front support and the back support when in an open state, so that the positions of the front support and the back support are relatively fixed, thereby limit the sliding range of the retracting sleeve 23 on the front support 21. In the embodiment, the supporting connector is a flexible supporting connector, for example, a rope is used as a supporting connector.

In the embodiment, the roller set 3 comprises a rolling wheel 31 and a fixing sleeve 32, and the rolling wheel is installed at the bottom of the front support 21 and the bottom of the back support 22 through the fixing sleeve 32, a second clutching buckle 42 is arranged on the fixing sleeve 32. When the second clutching buckle 42 is buckled on the fixing holes of the front support 21 and the back support 22, the rolling wheel 31 and the fixing sleeve 32 are respectively fixed on the front support 21 and the back support 22, when the second clutching buckle 42 is separated from the fixing holes of the front support and the back support, the rolling wheel 31 and the fixing sleeve 32 can be taken down from the front support 21 and the back support 22.

The multiuse foldable furniture in this embodiment can also be folded into a table or a chair state. When folded into a chair state, the push handle 5 is located at the top of the back plate 12 and can be used as a leaning structure for the head. When folded into a table state, the push handle 5 is located at one end of the table and does not influence the use of the table. Due to the existence of the rolling wheel, the movement of the table or chair is very convenient and labor-saving.

The multiuse foldable furniture in this embodiment can also be used as a trolley. The folding state of the trolley is the same as that of the table in the embodiment, the back plate 12 serves as a bearing part to place objects needing to be transported, and the push handle 5 serves as a force applying part, while pushing the push handle 5, the multiuse foldable furniture can be used as a trolley.

The embodiments above only express several specific embodiments of the present invention, and the description is specific and detailed, but should not be used to limit the scope of the invention. It should be noted that, for those skilled in the art, a plurality of deformations and improvements can be made without departing from the concept of the invention, all of which belong to the protection scope of the invention. Therefore, the protection scope of the invention is subject to the appended claims.

The invention claimed is:

1. A multiuse foldable furniture comprising:
a main body, and
two sets of side supports;
wherein
the main body comprises a seat plate and a back plate, the seat plate is hinged with the back plate, the two sets of side supports are respectively disposed at two sides of the main body;
each set of the side support comprises a front support, a back support, and a retracting sleeve, wherein, within the each set of the side support, the retracting sleeve is slidably sleeved outside the front support, the retracting sleeve is hinged with the back plate, the top of the front support is hinged with the back plate and attached to a hinge joint on the back plate, the top of the back support is hinged with the seat plate and attached to a side of the seat plate, a supporting connector is disposed between the front support and the back support, two ends of the support connector are hinged with the front support and the back support respectively and the front support is located on an outer side of the supporting connector and the back support is located on an inner side of the supporting connector.

2. The multiuse foldable furniture according to claim 1, wherein a clutching buckle is disposed on each retracting sleeve.

3. The multi-use foldable furniture according to claim 2, wherein the supporting connectors are rigid supporting connectors or flexible supporting connectors.

4. The multi-use foldable furniture according to claim 3, wherein the flexible supporting connectors are a rope.

5. The multiuse foldable furniture according to claim 1, wherein the seat plate is hinged at the middle to lower part of the back plate.

6. The multiuse foldable furniture according to claim 1, further comprising a roller set installed at the bottom of each front support and each back support.

7. The multiuse foldable furniture according to claim 6, wherein each roller set comprises a rolling wheel and a fixing sleeve, the rolling wheel is detachably installed at the bottom of the front support or at the bottom of the back support through the fixing sleeve, a clutching buckle is arranged on the fixing sleeve.

8. The multiuse foldable furniture according to claim 6, further comprising a push handle, wherein the push handle is arranged at a top part of the back plate.

9. The multiuse foldable furniture according to claim 1, further comprising a push handle, wherein the push handle is arranged at a top part of the back plate.

10. The multi-use foldable furniture according to claim 9, wherein the push handle is detachably mounted at the top part of the back plate.

11. The multiuse foldable furniture according to claim 1, further comprising a seat plate cushion and a back plate cushion, the seat plate cushion is arranged on a front surface of the seat plate, and the back plate cushion is arranged on a front surface of the back plate.

12. The multi-use foldable furniture according to claim 1, wherein the two front supports are connected by a front cross rod, the two back supports are connected by a back cross rod.

* * * * *